Aug. 19, 1930.  W. O. STOKES  1,773,206
VEHICLE DRIVING MECHANISM
Filed March 14, 1923   2 Sheets-Sheet 1

INVENTOR
William O. Stokes
BY HIS ATTORNEY

Aug. 19, 1930.    W. O. STOKES    1,773,206
VEHICLE DRIVING MECHANISM
Filed March 14, 1923    2 Sheets-Sheet 2

INVENTOR
William O. Stokes
BY HIS ATTORNEY

Patented Aug. 19, 1930

1,773,206

UNITED STATES PATENT OFFICE

WILLIAM O. STOKES, OF GOOD GROUND, NEW YORK

VEHICLE DRIVING MECHANISM

Application filed March 14, 1923. Serial No. 624,837.

This invention relates to motor vehicles and has for its object to enable such a vehicle to coast automatically and smoothly with free wheels whenever the wheels tend to turn faster than the motor, and also to enable the vehicle to be braked, or the engine started from the wheels by driving the engine under compression.

While automatic free wheel devices have heretofore been proposed for motor vehicles, so far as I am aware none have gone into practical use. One objection is that there is no proper control of the shifting clutch element between forward and reverse driving positions, causing the clutch to vibrate between the engaging positions. Another objection is the noise due to faulty design of the clutches, and a further objection is the lack of means to convert the drive into an ordinary drive, as for starting the engine, or using it as a brake, when desired.

According to this invention, a single automatically operable friction clutch may be located between the transmission and the differential, or at each driven wheel, in which case the differential gear becomes superfluous because one or the other clutch will release, as necessary for the differential wheel movement. In either form, when it is desired to have the wheels drive backward to the engine as is the usual practice, the clutch mechanism can be manually thrown for continuous connection of the wheels and the power line.

This application is a continuation in part of my prior application S. N. 380,791 filed May 12, 1920, for vehicle driving gear.

Referring to the drawings.

Figure 1:
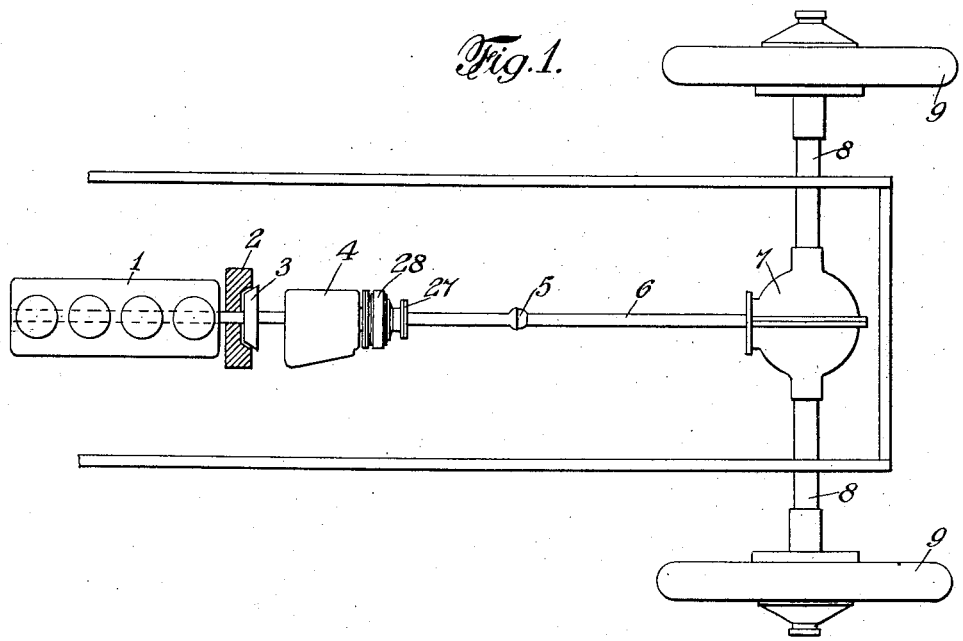
Figure 1 is a plan view of a motor vehicle chassis indicating the location of my invention.

In Fig. 1 the usual internal combustion engine, or other power plant 1 having the flywheel 2 is provided with a clutch 3, transmission mechanism 4, universal-joint 5, propeller shaft 6, differential housing 7, rear axle 8, and wheels 9.

Figure 2:
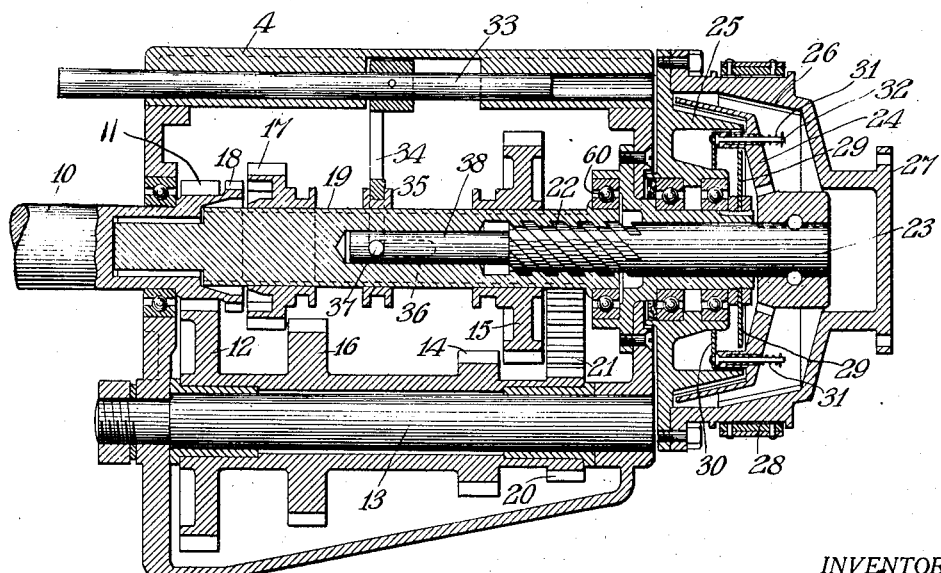
Fig. 2 is a horizontal section through the transmission mechanism shown in Fig. 1.

In Fig. 2 my invention is shown embodied in the propeller shaft between the transmission mechanism and the differential. The housing 4 for the transmission mechanism is somewhat similar to the customary design. The shaft 10 leading from the engine and clutch is provided with the gear 11 engaging the larger gear 12 on the countershaft 13 and for lowest speed the gear 14 on shaft 13 drives the gear 15 on the shaft 19 which is connected to the propeller shaft. For intermediate speeds the gears 16 and 17 cooperate, while for direct connection the gears 17 and 18 mesh to give the highest speed. For reversal the gear 20 on the shaft 13 drives the idler gear 21, which in turn drives the gear 15. Since the usual mechanism is provided for sliding the gears 15 and 17, such has not been shown on the drawing. The right end of the shaft 19 is shown as being supported by the ball bearings 60. The left end of the shaft 23 has a screw threaded cooperation within the shaft or driving member 19 by means of threads 22 of a large enough pitch to enable an axial thrust to produce translation between the shafts 23 and 19. In other words, the threads 22, as shown in Fig. 2 of the drawing, must form an angle of at least 45° with the vertical if longitudinal thrust is to produce shifting of one of the threaded members, as, for example, in braking by compression of the engine, but if the engine be not used for braking such large angled threads are not necessary though preferable to enable the shiftable clutch to be readily held in neutral. Keyed, or otherwise secured upon the driven member 23, is the shiftable clutch cone member 24 adapted for cooperation with either of the oppositely disposed clutch cones 25 or 26, both of which are secured to the vehicle propelling means, which in this case is the coupling flange 27 in the propeller shaft. The periphery of the housing for the oppositely disposed clutch parts may serve as a brake drum 28. Secured to the stationary housing is the annular disk 29, and secured to the clutch part 24 is the disk 30. After the driven member 23 is moved from engagement with the forward clutch part 25, the disks 29 and 30 cooperate to prevent the clutch part 24 being carried into cooperation with the reverse clutch part 26. The mounting of the disk 30 is yieldable by means of the springs 31 surrounding the pins 32 and the slidable clutch part 24 is adapted to be yieldingly moved a short distance under compression of the springs 31 after the disks 29 and 30 have engaged. Since one disk is stationary and the other rotatable their engagement will serve to brake and slow down the speed of the clutch part 24 whenever a sudden slowing of the engine causes the clutch part 24 to be quickly released from engagement with the clutch part 25 with a higher velocity than the driving member 19. Within the casing 4 of the transmission mechanism is the yieldable stub shaft 33 connected to the thrust member 34, which engages the rotatable collar 35, secured to the driving member 19 by means of the pin 37 which is adapted to slide in the slot 36 of the driving member 19. The pin 37 passes through the inner shaft, or axial thrust member 38, which is adapted to be moved against the abutting end of the driven member 23 to push the driven member to the left. The stub shaft 33 extends outside the casing surrounding the transmission 4 as shown in Fig. 2 so that it may be manually grasped for manipulation or connected to an ordinary foot pedal for operation.

In operation, the driving member 19 turns in a direction to cause the screw threads 22 to draw the driven member 23 to the left, as shown in Fig. 2, in driving the vehicle forward, whereby the slidable clutch part 24 engages the clutch part 25. Upon slowing down the engine on cutting out the main clutch 3, or whenever the wheels 9 turn faster than the driving member in coasting, the clutch part 25 turning faster than the driving member 19 drives the slidable clutch part 24 fast enough for it to be disengaged automatically. It may be desirable to provide an additional thrust bearing, not shown, for the driving member 19 to compensate for the axial thrust due to its pulling the movable clutch 24 into firm cooperation with the forward clutch part 25, or in the embodiment illustrated the ball bearing supporting the right end of the driving member 19 may be sufficient to take care of this axial thrust. In event the driving member 19 slows down considerably below the speed of the clutch part 25, the clutch part 24 may be spun fast enough to carry it into engagement with the opposite clutch part 26 unless some means are provided to prevent such accidental cooperation. This means comprises the disks 29 and 30, which yieldably prevent the clutch part 24 from being carried into engagement with the reversing clutch part 26. When it is desired to reverse the vehicle, the sudden thrust upon the driving member 19 may be sufficient to push the driven member 23 to the right and overcome the yieldable means for preventing engagement between clutch parts 24 and 26, or the thrust member 38 may be moved to the right so as to force the driven member and clutch part 24 into engagement with the reversing clutch part 26. The manual manipulation of the thrust member 38 to engage the clutch parts on reversal is not necessary because as soon as the disks 29 and 30 engage sufficient braking effect is produced to cause the driven member to be strongly forced into engagement with the reversing clutch part against the action of the springs 31. The disks 29 and 30 not only prevent the clutch part 24 from being drawn into cooperation with the reverse clutch part when turning too fast, but also act as a brake to slow down the movable clutch part 24 and more freely effect the axial movement of the driven member 23 due to its threaded cooperation with the driving member 19 since the threaded connection between the driving and driven member produces such axial thrust whenever there is a difference in rotative speeds between the two parts or a brake upon the driven member 23 as would be caused by the braking effect of the disks 29 and 30. The control by the thrust member 38 is needed when, for example, in coasting it is desired to use the engine operating on compression as a braking means. In such event the manually controlled thrust member 38 is necessary in order to overcome the resistance of the springs 31 and force the clutch part 24 into cooperation with the clutch part 26. In the embodiment illustrated the thrust member is effective to move the driven member 23 in only one direction, that is, to the right, in Fig. 2. It is not usually necessary for the engine to be braked while the car is moving in a reverse direction, but if desired such may be accomplished and the thrust member constructed so as to move the driven member 23 in either direction.

Figure 3:
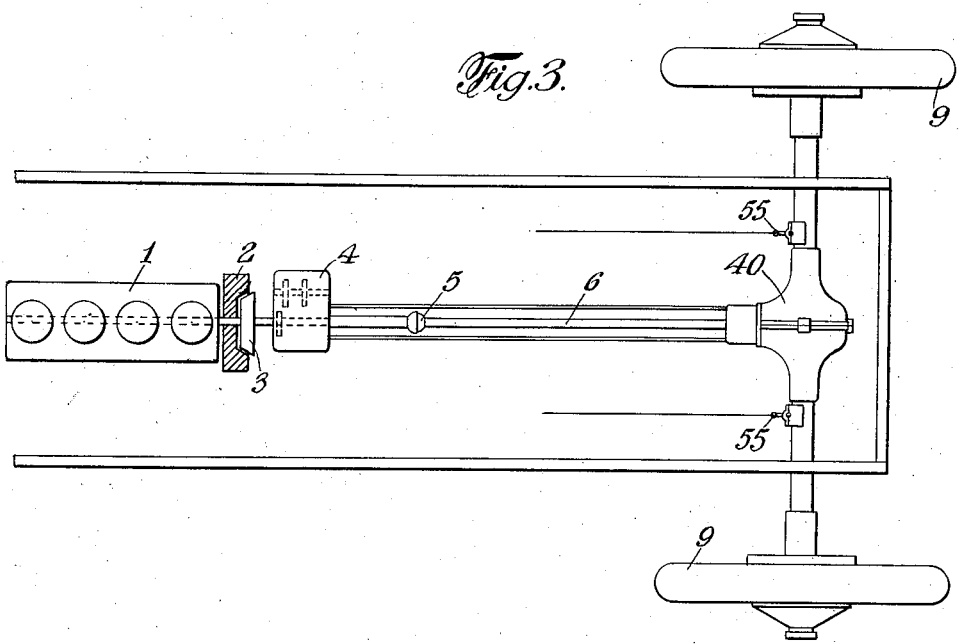
Fig. 3 is a view similar to Fig. 1 showing another location for my invention.

In Fig. 3 is shown the same arrangement of parts as shown in Fig. 1 except that the transmission housing 4 does not contain the present invention, which instead has been embodied in the housing 40 surrounding the rear axle.

Figure 4:
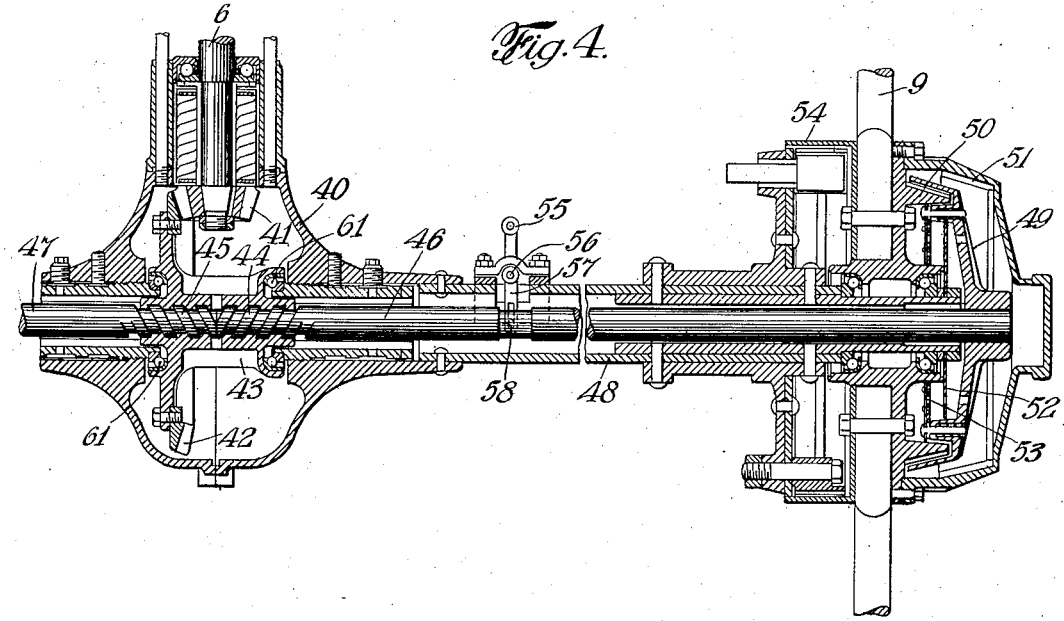
Fig. 4 is a horizontal sectional detail of the invention shown in Fig. 3.

Referring to Fig. 4 the propeller shaft 6 is provided with pinion 41 engaging the bevel gear 42, which latter is secured to the rotatable member 43 supported in the bearings 61. The bore of the member 43 is oppositely threaded to receive the opposite ends of the driven members 46 and 47, which are provided with the large pitch threads 44 and 45, having a function similar to the threads 22 in Fig. 2. In this construction, since no differential is necessary there may be times when one driven member 46 or 47 will be transmitting force to its wheels and the other not, such as may occur in rounding a corner. Since the stresses transmitted to the shafts 46 and 47 are not at all times of equal value the bearings 61 are located so as to be able to take up and compensate for any axial thrust upon the member 43. The driven members 46 and 47 lead to similar clutch parts and for simplification in the drawing only one such slidable clutch part 49 is shown within the hub of the wheel 9. The cooperating clutch cone 50 is for forward, while the opposite clutch cone 51 is for reverse. The disks 52 and 53 are similar in construction and function to the disks 29 and 30 already described. The periphery 54 may serve as a brake drum. The stationary housing 48 surrounding the driven member 46 is provided with a thrust lever 55 pivoted thereto at 56 and having the forked end 57 adapted to engage the reduced portion 58 of the driven member and force said driven member to the right for engagement of the clutch part 49 with the reverse clutch 51, as, for example, when it is desired to have the engine operate as a brake in going down hill. Suitable levers and a gate, or a solenoid actuated mechanism not shown may control the thrust members 34 and 55 and extend up to the driver's seat, according to common practice with slide gear transmissions. Member 34 and lever 55 may each of them be regarded as a latch to retain the shiftable clutch part in neutral.

While I have shown the invention herein applied either to the transmission or at the wheels, I do not restrict myself to these positions, since the parts in Fig. 2 pertaining to this invention may be separated from the transmission proper and be placed at the rear end of the propeller shaft adjacent the crown bevel driving pinion, or at the end of the propeller shaft just in front of a driving worm, without departing from the scope of the invention.

This invention has a number of advantages not heretofore obtained, among which may be mentioned that a slide gear transmission can be manipulated independent of the vehicle speed, which is not true with present day propulsion systems where there is a high rear axle ratio, a frequent difficulty being in shifting from high direct drive to second speed in a three-speed transmission, or from second to first, or in going from first to second. This is because of the large difference in peripheral speeds of the gears on the main and counter shafts in the transmission. With this invention it is obvious that the transmission can be practically idle so that any desired speed can be connected up, then the main clutch let in, then the shifting lever thrown to connect the wheels to act as a brake, so that even in case of a runaway down a hill the driver could very quickly get the engine connected through low gear without danger of stripping any of the transmission gears and very quickly control the vehicle.

As described in the previous application referred to, use of a worm drive with clutches in or adjacent the driving wheels not only does away with differential but enables a higher speed engine to be used and makes possible greater speed reduction between the propeller shaft and rear axle with greater road clearance than has heretofore been possible. If the engine is not used for braking a non-reversible worm of lower pitch than is now the practice can be used and this makes possible a greater speed reduction between the propeller shaft and rear axle without unduly increasing the size of the worm wheel on the rear axle or lessening the road clearance. With a worm drive it was not possible to use as high a speed engine as desirable because it was thought the worm had to be made non-reversible and in order to obtain desirable speed reduction the worm wheel had to be increased in size, which lessened road clearance, but these disadvantages can be overcome with this invention.

Another advantage of this invention is, particularly with the cone clutch as shown herein, that the manual shaft for braking will stay in of itself when once pushed in, without requiring any latches or ratchets, which would break in case the engine speeded up and it was attempted to automatically shift the movable clutch member from its position for driving the engine in braking.

In cars driven by planetary transmission, such as the Ford pleasure car or truck, the braking will be effected from coasting by pushing down on the reverse pedal which will shift the movable clutch member, whereupon the reverse pedal can be released and the shifted clutch member will stay in and allow the engine to brake. Also, with any form of transmission the braking retardation from the engine can be through any speed of the transmission. Coasting is automatic and relieves the vehicle from the drag due to the transmission.

Another advantage resides in the decreased wear on tires since when the wheels are jolted off the ground the driving torque on the wheels tends to stop, thereby reducing spinning.

I claim:

1. A motor vehicle driving mechanism comprising a motor, driven wheels, clutching means automatically releasing the wheels to permit coasting, manual means for moving said clutching means to one position, and automatic means for moving the clutching means therefrom.

2. In a motor vehicle, the combination with an engine, of a transmission mechanism, a clutch between said engine and transmission mechanism, a driven wheel, a clutch between said transmission mechanism and driven wheel, means for axially moving said last mentioned clutch into an inoperative position with respect to the driven wheel when the speed of the latter exceeds that of the engine, and means for holding the clutch in inoperative position only when the clutch is disengaged from the wheel.

3. In a motor vehicle, the combination with the usual engine, clutch, transmission, propeller shaft, and differential, of a second clutch located between the transmission and a traction wheel and comprising a slidable clutch part, and means for controlling said slidable clutch part either automatically or manually.

4. A vehicle driving mechanism comprising a driving member, a driven member in threaded engagement therewith, a clutch part carried by the driven member, a second clutch part adapted to be automatically engaged or disengaged with the first mentioned clutch part by relative translation between the driving and driven members while in threaded engagement, and manually controlled means for holding said first clutch part in neutral.

5. A motor vehicle driving mechanism comprising a driving shaft, a driven member in cooperation therewith, a clutch part rigidly fastened to said shaft, a clutch part attached to the driven member, the said clutch parts cooperating to drive the vehicle, and means for axially moving said clutch parts out of contact when the speed of the driven member exceeds that of the driving shaft.

6. In a motor vehicle, the combination of an engine, a driving shaft, a driven member, a clutch between the driving shaft and the driven member, means for moving said clutch into a neutral position whenever the speed of the driving shaft exceeds that of the driven member, and means for retarding the action of the clutch, the said retarding means being effective only when the clutch is in a neutral position.

7. A vehicle driving mechanism comprising a pair of spaced clutch members connected to a propulsion wheel, a shiftable cooperating clutch member for engagement with either of said spaced clutch members, a shiftable driven member connected to said second clutch member, a driving member, a screw threaded connection between said driving and driven members arranged to press said shiftable clutch member into engagement with one of said spaced clutch members on rotation in one direction and into engagement with the other of said spaced clutch members on rotation of the driving member in the opposite direction, and manually operated means to hold said shiftable clutch member in neutral.

8. In a vehicle driving mechanism, the combination with a driving member, of a slidable driven member in threaded cooperation therewith, a clutch part secured to the driven member, cooperating clutch parts for forward and reverse driving of the vehicle, one of said second mentioned clutch parts being on each side of the first mentioned clutch part and adapted to have said first mentioned clutch part cooperate therewith according to the direction of relative rotation between said first and second mentioned clutch parts, yieldable means to impede free sliding of the first mentioned clutch part from the forward to the reverse clutch part, but permitting free sliding thereof in the reverse direction.

9. In a vehicle driving mechanism, the combination with a driving member, of a slidable driven member in cooperation therewith, a clutch part secured to the driven member, cooperating clutch parts for forward and reverse driving of the vehicle, one of said second mentioned clutch parts being on each side of the first mentioned clutch part and adapted to have said first mentioned clutch part cooperate therewith, means for manually moving said first mentioned clutch part into engagement with one of said second mentioned clutch parts for driving the engine from the wheels for braking, means for automatically retaining said clutch parts in engagement during such braking without holding said manually movable means and means responsive to the relative rotation between said driving and driven members to release said clutch parts from said braking position.

10. A vehicle driving mechanism comprising a driving member, a slidable driven member having threaded engagement therewith by means of threads having a large pitch, a friction clutch part carried by the driven member, cooperating friction clutch parts on either side of the first mentioned clutch part, a stationary housing surrounding at least a part of the driven member, and means in cooperation with the housing and driven member adapted to slide said driven member.

11. A driving mechanism for a motor vehicle comprising in combination a driving member, a driven member having screw threaded engagement therewith, a clutch part carried by the driven member, a pair of cooperating clutch parts on either side of the first mentioned clutch part, and a thrust member adapted to slide said driven member and clutch part into cooperation with one of said second mentioned clutch parts.

12. A vehicle driving mechanism comprising a driving member, a driven member in threaded cooperation with the driving member, a clutch part carried by the driven member, cooperating clutch parts on either side of the said first mentioned clutch part, said first mentioned clutch part being adapted for automatic engagement with one of the second mentioned clutch parts upon a difference in rotative speeds therebetween, and a thrust member adapted to slide said driven member and first clutch part in only one direction.

13. In a driving mechanism for a motor vehicle, the combination with a driving member, of a driven member having screw threaded engagement with the driving member, a clutch part carried on the driven member, a second clutch part adapted to engage the first mentioned clutch part automatically upon a difference in angular velocity between said clutch parts, and a manually controlled means to move said first mentioned clutch part into neutral position out of engagement with said second mentioned clutch part.

14. In a vehicle driving mechanism, the combination with a driving member, of a driven member in threaded engagement therewith, a clutch part carried by the driven member, cooperating clutch parts on either side of the first mentioned clutch part, one adapted for engagement in driving the vehicle forward and the other for driving the vehicle backward, a manually operable thrust member adapted to slide the first mentioned clutch part, and a yieldable means adapted to prevent accidental movement of the first clutch part into cooperation with the reversing clutch part.

15. A vehicle driving mechanism comprising a driving member, a driven member in threaded engagement therewith, a clutch part carried by the driven member, a second clutch part adapted to be automatically engaged or disengaged with the first mentioned clutch part by relative translation between the driving and driven member, manually controlled means for holding said first clutch part in neutral, and yieldable means adapted to indicate the neutral position of the manually controlled means for retaining said clutch part in neutral.

16. In a motor vehicle driving mechanism, the combination with a driving member, of a driven member, a clutch part carried by the driven member, cooperating clutch parts on either side of the first mentioned clutch part and adapted for automatic engagement therewith according to the direction of rotation of the first clutch part and upon a difference in rotative speeds between said first mentioned clutch part and the other clutch parts, a housing surrounding at least a portion of said driven member, and means in cooperation with the housing and driven member for moving said first mentioned clutch part into engagement with one of the other clutch parts.

17. A vehicle driving mechanism comprising a driving member, a driven member in threaded engagement therewith, a clutch part carried by the driven member, a second clutch part adapted to be automatically engaged or disengaged with the first clutch part by a difference in speed and rotation between the driving and driven member, and stationary means adapted to prevent automatic movement of the first mentioned clutch part into engagement with the second mentioned clutch part.

18. A vehicle driving mechanism comprising a driving member, a driven member in threaded engagement therewith, a clutch part carried by the driven member, a second clutch part adapted to be automatically engaged or disengaged with the first clutch part by a difference in speed between the driving and driven member, and stationary means adapted to brake the driven member and first mentioned clutch part.

19. A vehicle driving mechanism comprising a driving member, a driven member, a clutch part secured to the driving member, a cooperating clutch part secured to the driven member, means for automatically engaging the clutch parts when the speed of the driving member is greater than the speed of the driven member, means for axially separating the clutch parts when the speed of the driven member is greater than that of the driving member, and means for retaining the clutch parts in disengaged relation, the said retaining means being effective only when the clutch parts are disengaged.

20. A vehicle driving mechanism comprising a driving member, a driven member having engagement therewith, a clutch member carried by the driven member, a connecting means between said driving and driven members adapted to automatically control said clutch member according to the relative speeds of the driving and driven members, a relatively stationary housing surrounding at least part of the driven member, and means in co-operation with said housing and driven member adapted to retain said clutch member in neutral.

21. A vehicle driving mechanism comprising a driving member, a shiftable driven member in threaded engagement therewith, a clutch member carried by the driven member, co-operating clutch members on either side of the first mentioned clutch member, a traction wheel connected to the second mentioned clutch members, a relatively stationary housing surrounding at least a portion of the driven member and a member adapted to brake the driven member in co-operation therewith and with said housing in shifting said driven member at neutral.

22. A vehicle driving mechanism comprising a driving member, a driven member having threaded co-operation with the driving member, a clutch member carried by the driven member, a second clutch member adapted for automatic co-operation with the first clutch member to enable the vehicle to coast whenever the wheel speed exceeds that of the driving member and a non-rotatable brake member to retain the first mentioned clutch member in neutral.

23. A vehicle driving mechanism comprising a driving member, a driven member having threaded co-operation with the driving member, a clutch member carried by the driven member, a second clutch member adapted for automatic co-operation with the first clutch member to enable the vehicle to coast whenever the wheel speed exceeds that of the driving member, a stationary housing, a collar on the driven member, another collar carried by said housing for co-operation with the collar on the driven member to brake said driven member, and at least one of said collars being yieldable.

24. A vehicle driving gear comprising a driven gear, a shaft threaded thereto to move in and out according to the direction of rotation of the gear, a clutch member carried by the shaft and movable therewith into and out of operative position, a wheel, a clutch member connected to the wheel co-operating with the shaft clutch member, automatic means for holding the shaft in disengaged position when the speed of the wheel exceeds that of the shaft, and manually operated means for releasably holding the shaft in disengaged position.

25. A vehicle driving gear comprising a shaft adapted for rotation about and for translation along its longitudinal axis, reversible driving means for said shaft, means causing said shaft to translate in one direction when driven forward and in the opposite direction when driven backward, driving means actuated by said shaft engageable when the shaft is in either of its extreme positions, and means engageable when the shaft is not being driven for retaining the shaft in neutral position.

26. A vehicle driving mechanism comprising a pair of spaced clutch members connected to a propulsion wheel, a shiftable co-operating clutch member for engagement therewith, a shiftable driven member connected to said second clutch member, a driving member, a screw thread connection between said driving and driven members having the threads thereof arranged at an angle of at least 45 degrees to enable an axial thrust between said driving and driven members to cause longitudinal movement therebetween, said screw thread connection being arranged to press said shiftable clutch member into engagement with one of the spaced clutch members on forward driving and into engagement with the other spaced clutch member on rotation in the opposite direction, and means for driving the engine from said wheel as a brake.

27. In a motor vehicle, the combination with an engine, of a transmission mechanism, a clutch between the transmission mechanism and the engine, a driving shaft for operating the vehicle wheel, a friction clutch mounted on the driving shaft and shiftable into forward, neutral and reverse positions, means for shifting the friction clutch into the neutral position to disconnect the driving shaft and wheel when the speed of the wheel becomes greater than that of the driving shaft, and means for axially moving the friction clutch into reverse position to permit the use of the transmission and engine as a brake.

Signed at New York city in the county of New York and State of New York this 13th day of March, A. D. 1923.

WILLIAM O. STOKES.